US012620587B2

(12) United States Patent
Chun et al.

(10) Patent No.: US 12,620,587 B2
(45) Date of Patent: May 5, 2026

(54) POSITIVE ELECTRODE ACTIVE MATERIAL AND LITHIUM SECONDARY BATTERY INCLUDING THE SAME

(71) Applicant: ECOPRO BM CO., LTD., Cheongju-si (KR)

(72) Inventors: Yu Gyeong Chun, Cheongju-si (KR); Moon Ho Choi, Cheongju-si (KR); Yoon Young Choi, Cheongju-si (KR); Jong Seung Shin, Cheongju-si (KR); Jin Ho Bae, Cheongju-si (KR); Jin Won Lee, Cheongju-si (KR)

(73) Assignee: ECOPRO BM CO., LTD., Cheongju-si (KR)

( * ) Notice: Subject to any disclaimer, the term of this patent is extended or adjusted under 35 U.S.C. 154(b) by 732 days.

(21) Appl. No.: 18/049,533

(22) Filed: Oct. 25, 2022

(65) Prior Publication Data

US 2023/0132296 A1      Apr. 27, 2023

(30) Foreign Application Priority Data

Oct. 26, 2021     (KR) ........................ 10-2021-0143300

(51) Int. Cl.
*H01M 4/525*          (2010.01)
*C01G 53/42*          (2025.01)
*H01M 4/505*          (2010.01)
*H01M 10/0525*        (2010.01)
*H01M 4/02*           (2006.01)

(52) U.S. Cl.
CPC ........... *H01M 4/525* (2013.01); *C01G 53/42* (2013.01); *H01M 4/505* (2013.01); *C01P 2002/52* (2013.01); *C01P 2002/85* (2013.01); *C01P 2004/82* (2013.01); *C01P 2006/40* (2013.01); *H01M 2004/028* (2013.01); *H01M 10/0525* (2013.01)

(58) Field of Classification Search
CPC ....... H01M 2004/028; H01M 10/0525; H01M 4/525; C01P 2002/85
See application file for complete search history.

(56) References Cited

U.S. PATENT DOCUMENTS

| | | | | |
|---|---|---|---|---|
| 2014/0158932 A1* | 6/2014 | Sun | ........................ | H01M 4/13 |
| | | | | 252/182.1 |
| 2018/0108940 A1 | 4/2018 | Kwon et al. | | |
| 2019/0157658 A1 | 5/2019 | Lee et al. | | |
| 2021/0119204 A1* | 4/2021 | Celasun | ................. | C01G 53/42 |
| 2021/0119205 A1 | 4/2021 | Choi et al. | | |
| 2021/0280863 A1 | 9/2021 | Liu et al. | | |
| 2022/0020983 A1* | 1/2022 | Lho | ........................ | H01M 4/525 |
| 2024/0339605 A1* | 10/2024 | Blangero | ............... | C01G 53/44 |

FOREIGN PATENT DOCUMENTS

| | | |
|---|---|---|
| JP | 2018-532236 A | 11/2018 |
| KR | 10-2081858 B1 | 2/2020 |
| KR | 10-2020-0022313 A | 3/2020 |

* cited by examiner

*Primary Examiner* — Allison Bourke
*Assistant Examiner* — Verita E Grannum
(74) *Attorney, Agent, or Firm* — Studebaker Brackett PLLC

(57)          ABSTRACT

The present invention relates to a positive electrode active material and a lithium secondary battery including the same, and more particularly, to a positive electrode active material including a lithium composite oxide containing at least nickel and cobalt, wherein since the cobalt in the lithium composite oxide has a concentration gradient having at least different slopes from a surface portion toward a central portion, it is possible to improve the stability of particles not only in a surface portion of the lithium composite oxide but also in a central portion thereof, a positive electrode including the positive electrode active material, and a lithium secondary battery using the negative electrode.

9 Claims, No Drawings

POSITIVE ELECTRODE ACTIVE MATERIAL AND LITHIUM SECONDARY BATTERY INCLUDING THE SAME

CROSS-REFERENCE TO RELATED APPLICATION

This application claims priority to and the benefit of Korean Patent Application No. 10-2021-0143300, filed on Oct. 26, 2021, the disclosure of which is incorporated herein by reference in its entirety.

BACKGROUND

1. Field of the Invention

The present invention relates to a positive electrode active material and a lithium secondary battery including the same, and more particularly, to a positive electrode active material including a lithium composite oxide containing at least nickel and cobalt, wherein since the cobalt in the lithium composite oxide has a concentration gradient having at least different slopes from a surface portion toward a central portion, it is possible to improve the stability of particles not only in the surface portion of the lithium composite oxide but also in the central portion thereof, a positive electrode including the positive electrode active material, and a lithium secondary battery using the positive electrode

2. Discussion of Related Art

Batteries store electrical power by using materials facilitating an electrochemical reaction at a positive electrode and a negative electrode. As a representative example of such batteries, there is a lithium secondary battery storing electrical energy due to a difference in chemical potential when lithium ions are intercalated/deintercalated into/from a positive electrode and a negative electrode.

The lithium secondary battery uses materials enabling reversible intercalation/deintercalation of lithium ions as positive electrode and negative electrode active materials, and is manufactured by charging an organic electrolyte solution or a polymer electrolyte solution between the positive electrode and the negative electrode.

A lithium composite oxide is used as a positive electrode active material of the lithium secondary battery, and composite oxides such as $LiCoO_2$, $LiMn_2O_4$, $LiNiO_2$, $LiMnO_2$, etc.

Are being studied.

Among the positive electrode active materials, $LiCoO_2$ is most widely used due to excellent lifetime characteristics and charge/discharge efficiency, but it is expensive because of the limited resource of cobalt, which is used as a raw material, and thus has a disadvantage of limited price competitiveness.

Lithium manganese oxides such as $LiMnO_2$ and $LiMn_2O_4$ have advantages of excellent thermal safety and low costs, but also have problems of small capacity and poor high-temperature characteristics. In addition, while a $LiNiO_2$-based positive electrode active material exhibits a battery characteristic such as a high discharging capacity, due to cation mixing between Li and a transition metal, it is difficult to synthesize the $LiNiO_2$-based positive electrode active material, thereby causing a big problem in rate characteristics.

In addition, depending on the intensification of such cation mixing, a large amount of Li by-products is generated, and since most of the Li by-products consist of compounds of LiOH and $Li_2CO_3$, they become a cause of gelation in preparation of a positive electrode paste and gas generation according to charge/discharge progression after the preparation of an electrode. Residual $Li_2CO_3$ increases the swelling phenomenon of a cell and thus reduces cycles and also leads to the swelling of a battery.

Meanwhile, the lithium composite oxide included in the positive electrode active material involves a change in volume according to intercalation/deintercalation of lithium ions with respect to the lithium composite oxide during charging and discharging. Usually, the lithium composite oxide is in the form of a secondary particle in which a plurality of primary particles are aggregated, and there is a problem in that a rapid change in volume of the primary particles occurs during charging and discharging, cracks are generated in the secondary particle when a stress due to repeated charging and discharging is accumulated, or a collapse of a crystal structure or a change in crystal structure (phase transition) occurs.

Since this problem in turn acts as a cause of degrading the stability and reliability of the positive electrode active material, various studies have been made to mitigate the change in volume of the lithium composite oxide during charging and discharging, or minimize the occurrence of stress due to the change in volume, thereby preventing damage to the particles.

SUMMARY OF THE INVENTION

In the lithium secondary battery market, while the growth of lithium secondary batteries for electric vehicles is playing a leading role in the market, the demand for positive electrode materials used in lithium secondary batteries is also continuously changing.

For example, in the past, lithium secondary batteries using LFP have been mainly used from the viewpoint of ensuring safety, but in recent years, the use of nickel-based lithium composite oxides having a larger energy capacity per weight compared to LFP has been expanding.

Accordingly, a positive electrode active material used in a higher-spec lithium secondary battery needs to satisfy both stability and reliability which are properly expected even under more severe operating conditions.

Conventionally, the stress due to the change in volume of primary particles was dispersed by intentionally lowering the degree of aggregation of the primary particles to prevent damage to the particles by mitigating the change in volume of the lithium composite oxide during charging and discharging or minimizing the occurrence of stress due to the changes in volume, so that there are predetermined voids between the primary particles. However, the lithium composite oxide has a limitation in that the energy density per unit volume is low.

Under these circumstances, it has been found by the present inventors that, when the cobalt in a lithium composite oxide containing at least nickel and the cobalt has a concentration gradient having at least different slopes from a surface portion toward a central portion, it is possible to improve the stability of particles not only in the surface portion of the lithium composite oxide but also in the central portion thereof.

Accordingly, an object of the present invention is to provide a positive electrode active material including a lithium composite oxide containing at least nickel and cobalt, wherein the cobalt in the lithium composite oxide has a concentration gradient that decreases from a surface portion of the lithium composite oxide toward a central portion thereof, the concentration gradient of the cobalt has at least different slopes, and the signs of the different slopes are the same.

Also, an object of the present invention is to provide a positive electrode active material including a lithium composite oxide which is a secondary particle in which a plurality of primary particles are aggregated and formed with a coating layer configured to cover at least a part of an interface between the primary particles and a surface of the secondary particle, wherein the cobalt in the lithium composite oxide has a concentration gradient that decreases from a surface portion of the lithium composite oxide toward a central portion thereof, the concentration gradient of the cobalt has at least different slopes, and the signs of the different slopes are the same.

Further, another object of the present invention is to provide a positive electrode including the positive electrode active material as defined herein.

In addition, still another object of the present invention is to provide a lithium secondary battery using the positive electrode as defined herein.

According to one aspect of the present invention, there is provided a positive electrode active material including a lithium composite oxide containing at least nickel and cobalt, wherein the cobalt in the lithium composite oxide has a concentration gradient that decreases from a surface portion of the lithium composite oxide toward a central portion thereof, wherein the concentration gradient of the cobalt has at least different slopes.

The concentration gradients of the cobalt present in the lithium composite oxide have at least different slopes, and signs of the different slopes are the same. That is, the cobalt present in the lithium composite oxide differs only in the extent to which the concentration decreases in a region where the different slopes are present, and a direction in which the concentration decreases is the same.

In one embodiment, an absolute value of a slope of the cobalt in the lithium composite oxide relatively close to the surface portion of the lithium composite oxide may be greater than an absolute value of a slope of the cobalt relatively close to the central portion of the lithium composite oxide.

In one embodiment, in Energy Profiling-Energy Dispersive X-Ray Spectroscopy (EP-EDS) analysis which measures a cumulative concentration of the cobalt to a depth to which an electron beam penetrates from a surface of a secondary particle using the electron beam radiated with an acceleration voltage increasing from 1 kV to 30 kV with respect to the surface of the lithium composite oxide, an inflection point at which the slope of the concentration gradient of the cobalt in the lithium composite oxide changes in a region of where the acceleration voltage is 7.5 kV to 12.5 kV may be present.

In addition, the lithium composite oxide is a secondary particle in which a plurality of primary particles are aggregated, and cobalt in the secondary particle may have a concentration gradient that decreases from a surface portion of the secondary particle toward a central portion thereof.

In this case, in the EP-EDS analysis which measures the cumulative concentration of the cobalt from the surface of the secondary particle to a depth to which an electron beam penetrates using the electron beam radiated with an acceleration voltage increasing from 1 kV to 30 kV with respect to the surface of the secondary particle, an inflection point at which a slope of the concentration gradient of the cobalt in the secondary particle changes in the range of where the acceleration voltage is 7.5 kV to 12.5 kV may be present.

In one embodiment, when the slope of the concentration gradient of the cobalt in the lithium composite oxide in a region where the acceleration voltage is 1 kV to 10 kV is s1, s1 may satisfy Equation 1 below.

$$2.0 \leq s1 \leq 3.6 \qquad \text{[Equation 1]}$$

In addition, when the slope of the concentration gradient of the cobalt in the lithium composite oxide in a range where the acceleration voltage is 10 kV to 30 kV is s2, s2 may satisfy Equation 2 below.

$$0.2 \leq s2 \leq 0.7 \qquad \text{[Equation 2]}$$

Preferably, when s1 represents the slope of the concentration gradient of the cobalt in the lithium composite oxide in the range where the acceleration voltage is 1 kV to 10 kV and s2 represents the slope of the concentration gradient of the cobalt in the lithium composite oxide in the range where the acceleration voltage is 10 kV to 30 kV, s1 and s2 may satisfy Equation 3 below:

$$1.7 \leq s1 - s2 \leq 3.0 \qquad \text{[Equation 3]}$$

In one embodiment, the lithium composite oxide may be represented by the following Chemical Formula 1.

$$\text{Li}_w\text{Ni}_{1-(x+y+z+z')}\text{Co}_x\text{M1}_y\text{M2}_z\text{B}_{z'}\text{O}_2 \qquad \text{[Chemical Formula 1]}$$

where M1 is at least one selected from Mn and Al,

M2 is at least one selected from P, Sr, Ba, Ti, Zr, Mn, Al, W, Ce, Hf, Ta, Cr, F, Mg, Cr, V, Fe, Zn, Si, Y, Ga, Sn, Mo, Ge, Nd, Gd, and Cu, M1 and M2 are different from each other, $0.5 \leq w \leq 1.5$, $0 \leq x \leq 0.50$, $0 \leq y \leq 0.20$, $0 \leq z \leq 0.20$, and $0 \leq z' \leq 0.20$.

The lithium composite oxide may further include a coating layer covering at least a portion of an interface between the primary particles and the surface of the secondary particle. In this case, at least one metal oxide represented by the following Chemical Formula 2 may be present in the coating layer.

$$\text{Li}_a\text{M3}_b\text{O}_c \qquad \text{[Chemical Formula 2]}$$

where M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd, and Nd, $0 \leq a \leq 10$, $0 \leq b \leq 8$, and $2 \leq c \leq 13$, provided that a and b are not simultaneously 0.

In addition, according to another aspect of the present invention, there is provided a positive electrode including the positive electrode active material as defined herein.

In addition, according to still another aspect of the present invention, there is provided a lithium secondary battery using the positive electrode as defined herein.

As described above, a lithium composite oxide included in a positive electrode active material inevitably involves a change in volume according to intercalation/deintercalation of lithium ions with respect to the lithium composite oxide during charging and discharging. In this case, there can be various ways of mitigating the change in volume of the lithium composite oxide during charging and discharging or minimizing the occurrence of stress due to the change in volume to prevent damage to particles, but it is difficult to say that the problem of degradation of a lithium secondary battery caused by damage to the lithium composite oxide included in the positive electrode active material has been sufficiently solved.

However, according to the present invention, in the lithium composite oxide containing at least nickel and cobalt, when a concentration gradient of the cobalt has at least different slopes having the same sign as each other while the concentration gradients of the cobalt in the lithium composite oxide have a concentration gradient that decreases from a surface portion of the lithium composite oxide to a central portion thereof, problems such as the generation of cracks in a secondary particle, the collapse of a crystal structure, or the change in crystalline structure (phase transition) can be improved despite repeated charging and discharging.

Accordingly, when the positive electrode active material according to the present invention is used, it will be possible to delay the performance degradation of the lithium secondary battery due to the positive electrode active material.

In addition to the above-described effects, the specific effects of the present invention will be described together while describing specific details for carrying out the invention below.

DETAILED DESCRIPTION OF EXEMPLARY EMBODIMENTS

Hereinafter, a positive electrode active material according to the present invention and a lithium secondary battery including the positive electrode active material will be described in more detail.

Positive Electrode Active Material

According to one aspect of the present invention, there is provided a positive electrode active material including a lithium composite oxide containing at least nickel and cobalt. In addition, the lithium composite oxide includes lithium in addition to nickel and cobalt, and is a composite metal oxide capable of intercalation and deintercalation of lithium ions.

The cobalt in the lithium composite oxide may have a concentration gradient that decreases from a surface portion of the lithium composite oxide toward a central portion thereof. The concentration of a transition metal in the lithium composite oxide may be measured by various known methods. For example, after cross-sectioning the lithium composite oxide, the concentration of a target transition metal may be analyzed using a line scanning method through Energy Dispersive X-Ray Spectroscopy (EDS) mapping. In this case, a change in the concentration of the target transition metal in a direction from the surface portion of the lithium composite oxide toward the central portion thereof may be confirmed. In addition, there is an Energy Profiling-Energy Dispersive X-ray Spectroscopy (EP-EDS) method which measures the concentration of the target transition metal accumulated from the surface of the lithium composite oxide to a certain depth to which an electron beam penetrates for an acceleration voltage while changing the acceleration voltage ($V_{acc}$) of the electron beam radiated to the surface thereof.

In the present application, the concentration of the transition metal was analyzed by the above-described EP-EDS method. Specifically, in EP-EDS analysis which measures the cumulative concentration of the cobalt from the surface of the secondary particle to the depth to which the electron beam penetrates using the electron beam radiated with an acceleration voltage increasing from 1 kV to 30 kV with respect to the surface of the lithium composite oxide according to the present application, the lithium composite oxide exhibits a concentration gradient in which the concentration of the cobalt decreases from the surface portion toward the central portion.

For example, when it is possible to penetrate an electron beam to a depth of about 300 nm from the surface of the lithium composite oxide by irradiating an electron beam with an acceleration voltage of 10 kV to the surface of the lithium composite oxide, it possible to measure the concentration of the target transition metal present in a region of 300 nm in depth from the surface of the lithium composite oxide through the EP-EDS analysis. In addition, when it is possible to penetrate an electron beam to a depth of about 800 nm from the surface of the lithium composite oxide by irradiating an electron beam with an acceleration voltage of 20 kV to the surface of the lithium composite oxide, it possible to measure the concentration of the target transition metal present in the region of 800 nm in depth from the surface of the lithium composite oxide through the EP-EDS analysis.

That is, when the cumulative concentration of the target transition metal to be measured decreases as the acceleration voltage of the electron beam radiated to the surface of the lithium composite oxide increases, it can be interpreted as having a gradient in which the concentration the target transition metal decreases from the surface portion of the lithium composite oxide toward the central portion thereof.

In this case, the concentration gradient of the cobalt may be a concentration gradient in which the concentration of the cobalt continuously decreases or intermittently decreases from the surface portion of the lithium composite oxide toward the central portion thereof.

That is, when the concentration of the cobalt decreases from a start point to an end point in an arbitrary interval for measuring the concentration of the cobalt, the cobalt may be referred to as having a concentration gradient that decreases from a start point toward an end point in the arbitrary interval.

In addition, the concentration gradient of the cobalt in the lithium composite oxide may have at least different slopes. That is, a plurality of concentration gradient sections having different slopes may be present along a direction from the surface portion toward the central portion of the lithium composite oxide.

In this case, the different slope indicated by the concentration gradient of the cobalt in the lithium composite oxide means that there is a different slope with a significant difference. That is, the different slope indicates a difference outside the error range, and preferably refers to a different slope indicating a difference of 2 times or more, more preferably a different slope indicating a difference of 3 times or more. For example, when the slope of any one of the different slopes has a slope of x, and another slope preferably has a slope of 2× or more, more preferably 3× or more, it can be seen that there is a different slope as defined herein.

When the concentration gradient section closest to the outermost portion of the lithium composite oxide is referred to as a first concentration gradient section, and the concentration gradient section present inside the first concentration gradient section is referred to as a second concentration gradient section, the slope of the concentration gradient of the cobalt in the first concentration gradient section and the slope of the concentration gradient of the cobalt in the second concentration gradient section are independent of each other, but will have the same sign.

Meanwhile, when the concentration of the transition metal in the lithium composite oxide is analyzed by the above-described EP-EDS method, an absolute value of the slope of the concentration gradient of the cobalt in the section relatively close to the surface portion of the lithium composite oxide may be greater than an absolute value of the slope of the concentration gradient of the cobalt in the section relatively close to the central portion of the lithium composite oxide.

According to the example described above, the absolute value of the slope of the concentration gradient of the cobalt in the first concentration gradient section may be greater than the absolute value of the slope of the concentration gradient of the cobalt in the second concentration gradient section.

That is, the extent of reduction in the concentration of the cobalt in a region relatively close to the surface portion of the lithium composite oxide will be large, and the extent of reduction in the concentration of the cobalt in the region relatively close to the central portion of the lithium composite oxide will be small.

As described above, by forming the first concentration gradient section and the second concentrations gradient section, in which the absolute values of the slopes of the concentration gradients of the cobalt are different from each other from the surface portion of the lithium composite oxide toward the central portion thereof, particle stability in the surface portion of the lithium composite oxide in which intercalation/deintercalation of lithium ions is intensively carried out can be increased, and by reducing the reduction width of the cobalt in the second concentration gradient section, it is possible to increase the particle stability not only in the surface portion thereof but also in the central portion thereof.

Specifically, in the EP-EDS analysis which measures the cumulative concentration of the cobalt from the surface of the secondary particle to the depth to which an electron beam penetrates using the electron beam radiated with an acceleration voltage increasing from 1 kV to 30 kV with respect to the surface of the lithium composite oxide, an inflection point at which the slope of the concentration gradient of the cobalt in the lithium composite oxide changes in the region where the acceleration voltage is 7.5 kV to 12.5 kV may be present.

Here, the inflection point may be a point at which the above-described first concentration gradient section is switched to the second concentration gradient section.

When the inflection point defined above is present at a position where the acceleration voltage is less than 7.5 kV under the premise that the total amount of cobalt in the lithium composite oxide is the same, it can be difficult to sufficiently prevent damage to particles such as the generation of cracks, the collapse of the crystal structure, or the change in crystal structure (phase transition) in the lithium composite oxide as the point at which the first concentration gradient section is switched to the second concentration gradient section is excessively close to the outermost portion of the lithium composite oxide.

On the other hand, when the inflection point as defined above is present at a position where the acceleration voltage is greater than 12.5 kV under the premise that the total amount of cobalt in the lithium composite oxide is the same, it can be difficult to sufficiently prevent damage to particles such as the generation of cracks, the collapse of the crystal structure, or the change in crystal structure (phase transition) in the surface portion of the lithium composite oxide as the point at which the first concentration gradient section is switched to the second concentration gradient section is excessively far away from the outermost portion of the lithium composite oxide.

The lithium composite oxide as defined herein may be represented by the following Chemical Formula 1.

$$Li_wNi_{1-(x+y+z+z')}Co_xM1_yM2_zB_{z'}O_2 \qquad \text{[Chemical Formula 1]}$$

where M1 is at least one selected from Mn and Al,

M2 is at least one selected from P, Sr, Ba, Ti, Zr, Mn, Al, W, Ce, Hf, Ta, Cr, F, Mg, Cr, V, Fe, Zn, Si, Y, Ga, Sn, Mo, Ge, Nd, Gd, and Cu, M1 and M2 are different, $0.5 \leq w \leq 1.5$, $0 \leq x \leq 0.50$, $0 \leq y \leq 0.20$, $0 \leq z \leq 0.20$, and $0 \leq z' \leq 0.20$.

The lithium composite oxide may be a high-Ni type lithium composite oxide in which concentrations (mol %) of Ni, Co, M1, M2, and B in Chemical Formula 1 satisfy Relational Formula 1 below.

$$Ni/(Ni+Co+M1+M2+B) \geq 80.0. \qquad \text{[Relational Formula 1]}$$

In addition, in the lithium composite oxide, the concentrations (mol %) of Ni, Co, M1, M2, and B in Chemical Formula 1 satisfy Relational Equation 1 above, and at the same time, may be a high-Ni/low-Co type lithium composite oxide in which the content of cobalt is 10 mol % or less, preferably 5 mol % or less.

In this case, the concentrations (mol %) of Ni, Co, M1, M2, and B in Chemical Formula 1 may satisfy Relational Formula 2 below.

$$Co/(Ni+Co+M1+M2+B) \leq 5.0. \qquad \text{[Relational Formula 2]}$$

In general, in a lithium composite oxide containing at least nickel and cobalt, it is known that as the content of nickel increases, structural instability of the lithium composite oxide may be caused by Li/Ni cation mixing. In addition, in the lithium composite oxide containing at least nickel and cobalt, it is reported that, as the content of cobalt decreases, the initial overvoltage (resistance) increases, and accordingly, a decrease in rate characteristics is unavoidable.

However, the lithium composite oxide included in the positive electrode active material according to one embodiment of the present invention can have a concentration gradient in which the concentration of the cobalt from the surface portion of the lithium composite oxide toward the central portion thereof exhibits at least different slopes and decreases, thereby alleviating and/or preventing the structural instability and deterioration in rate characteristics of the high-Ni type or high-nickel/low-Co type lithium composite oxide.

Meanwhile, the lithium composite oxide included in the positive electrode active material as defined herein may be a secondary particle including at least one primary particle.

Here, "a secondary particle including at least one primary particle" shall be interpreted to include both "a particle formed by aggregation of a plurality of primary particles" or "a particle in a non-aggregated form including a single primary particle."

The primary particle and the secondary particle may each independently have a rod shape, an oval shape, and/or an irregular shape.

When an average long axis length is used as an index indicating the sizes of the primary particle and the secondary particle, the average long axis length of the primary particle constituting the lithium composite oxide may be in the range of 0.1 μm to 5 μm, and the average long axis length of the secondary particle may be in the range of 1 μm to 30 μm. The average long axis length of the secondary particle may vary depending on the number of the primary particles constituting the secondary particle, and particles having various average long axis lengths may be included in the positive electrode active material.

When the lithium composite oxide is "a particle in a non-aggregated form including a single primary particle" or "a particle formed by aggregation of a relatively small number of primary particles," the size (average particle diameter) of the primary particles included in "the particle in the non-aggregated form including a single primary particle" or "the particle formed by aggregation of a relatively low number of primary particles" may be larger than the size (average particle diameter) of the primary particles included in "the secondary particle formed by aggregation of several tens to several hundreds or more of primary particles."

As such, the lithium composite oxide that is "a particle in a non-aggregated form including a single primary particle" or "a particle formed by aggregation of a relatively small number of primary particles" generally requires strong heat treatment conditions (high heat treatment temperature/long-time heat treatment) as compared to when producing "a secondary particle formed by aggregation of several tens to several hundreds or more of primary particles." In general, it is known that, when heat treatment is performed at a temperature close to 1,000° C. for a long time, particle growth (crystal growth) is promoted to obtain a positive electrode active material in which the size of a single particle is increased and the aggregation degree of the particles is lowered at the same time.

For example, when the lithium composite oxide is "a particle in a non-aggregated form including a single primary particle" or "a particle formed by aggregation of a relatively small number of primary particles," the average long axis length of the primary particles may be in the range of 0.5 μm to 20 μm. On the other hand, when the lithium composite oxide is "a particle formed by aggregation of a plurality of (tens to hundreds or more) primary particles," the average long axis length of the primary particles may be in the range of 0.1 μm to 5 μm.

In addition, the primary particle may include at least one crystallite. That is, the primary particle may be formed as a single crystallite or may be present as a particle including a plurality of crystallites.

In one embodiment, the lithium composite oxide is a secondary particle in which a plurality of primary particles are aggregated, and the cobalt in the secondary particle may have a concentration gradient that decreases from the surface portion of the secondary particle toward the central portion thereof.

In this case, the concentration gradients of the cobalt formed in the secondary particle have at least different slopes, and signs of the different slopes are the same.

In addition, in the EP-EDS analysis which measures the cumulative concentration of the cobalt from the surface of the secondary particle to the depth to which the electron beam penetrates using the electron beam radiated with an acceleration voltage increasing from 1 kV to 30 kV with respect to the surface of the secondary particle, an inflection point at which the slope of the concentration gradient of the cobalt in the secondary particle changes in the region where the acceleration voltage is 7.5 kV to 12.5 kV may be present.

As described above, the inflection point may refer to a point at which the first concentration gradient section described above in the secondary particle is switched to the second concentration gradient section.

In this case, the position of the inflection point may be determined to be a position where the slope of the concentration gradient of the cobalt in the secondary particle rapidly changes, but may also be determined to be a position where an arbitrary acceleration voltage penetrates during EP-EDS analysis.

For example, a region of an acceleration voltage of 1 kV to 10 kV is defined as the first concentration gradient section, and the slope of the concentration gradient of the cobalt in the lithium composite oxide in the first concentration gradient section may be referred to as s1. In addition, a region of an acceleration voltage of 10 kV to 30 kV is defined as the second concentration gradient section, and the slope of the concentration gradient of the cobalt in the lithium composite oxide in the second concentration gradient section may be referred to as s2. Of course, an additional concentration gradient section may be present inside the second concentration gradient section, but the particle stability of the lithium composite oxide intended herein can be sufficiently enhanced through the slope of the concentration gradient of the cobalt in the first concentration gradient section and the slope of the concentration gradient of the cobalt in the second concentration gradient section.

The slope s1 of the concentration gradient of the cobalt in the lithium composite oxide in the first concentration gradient section may satisfy Equation 1 below.

$$2.0 \leq s1 \leq 3.6 \qquad \text{[Equation 1]}$$

The fact that slope s1 of the concentration gradient in the first concentration gradient section is greater than 3.6 under the premise that the total amount of cobalt in the lithium composite oxide is the same, can mean that the point at which the first concentration gradient section is switched to the second concentration gradient section is excessively close to the outermost portion of the lithium composite oxide. In this case, it may be difficult to sufficiently prevent damage to particles such as the generation of cracks, the collapse of the crystal structure, or the change in crystal structure (phase transition) in the lithium composite oxide.

On the other hand, the fact that the slope s1 of the concentration gradient in the first concentration gradient section is less than 2.0 under the premise that the total amount of cobalt in the lithium composite oxide is the same, can mean that the point at which the first concentration gradient section is switched to the second concentration gradient section is excessively far away from the outermost portion of the lithium composite oxide. In this case, rather, as the content of cobalt in the surface portion of the lithium composite oxide is reduced, it may be difficult to sufficiently prevent damage to particles such as the generation of cracks, the collapse of the crystal structure, or the change in crystal structure (phase transition) in the surface portion of the lithium composite oxide.

In addition, the slope s2 of the concentration gradient of the cobalt in the lithium composite oxide in the second concentration gradient section may satisfy Equation 2 below.

$$0.2 \leq s2 \leq 0.7 \qquad \text{[Equation 2]}$$

The fact that the slope s2 of the concentration gradient in the second concentration gradient section is greater than 0.7 under the premise that the total amount of cobalt in the lithium composite oxide is the same, can mean that the extent of reduction in the concentration of the cobalt in the second concentration gradient section is excessively large. In this case, it may be difficult to sufficiently prevent damage to particles such as the generation of cracks), the collapse of the crystal structure, or the change in crystal structure (phase transition) in the lithium composite oxide (in the second concentration gradient section.

On the other hand, the fact that the slope s2 of the concentration gradient in the second concentration gradient section is smaller than 0.2 under the premise that the total amount of cobalt in the lithium composite oxide is the same, can mean that the extent of reduction in the concentration of the cobalt in the second concentration gradient section is excessively less. In this case, rather, as the content of cobalt in the region adjacent to the surface portion of the lithium composite oxide is reduced, it may be difficult to sufficiently prevent damage to particles such as the generation of cracks, the collapse of the crystal structure, or the change in crystal structure (phase transition) in the region adjacent to the surface portion of the lithium composite oxide.

In addition, with respect to the particle stability of the lithium composite oxide, it was confirmed that the slope s1 of the concentration gradient of the cobalt in the lithium composite oxide in the first concentration gradient section and the slope s2 of the concentration gradient of the cobalt in the lithium composite oxide in the second concentration gradient section had a predetermined correlation.

Specifically, when s1 and s2 satisfy Equation 3 below, particle stability can be improved in the central portion of the lithium composite oxide as well as in the first concentration gradient section and the second concentration gradient section of the lithium composite oxide.

$$1.7 \leq s1-s2 \leq 3.0 \hspace{2cm} \text{[Equation 3]}$$

Additionally, the lithium composite oxide may further include a coating layer covering at least a portion of an interface between the primary particles and a surface of the secondary particle. In this case, at least one, preferably at least two metal oxides, represented by the following Chemical Formula 2 may be present in the coating layer.

$$Li_aM3_bO_c \hspace{2cm} \text{[Chemical Formula 2]}$$

where M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd, and Nd, $0 \leq a \leq 10$, $0 \leq b \leq 8$, and $2 \leq c \leq 13$, provided that a and b are not simultaneously 0.

The coating layer may be in a form in which different metal oxides are simultaneously present in one layer, or in which different metal oxides represented by Chemical Formula 2 are present in separate layers.

The metal oxide represented by Chemical Formula 2 may be physically and/or chemically bonded to the primary particle and/or the secondary particle. In addition, the metal oxide may be present in a state in which a solid solution is formed with the primary particle and/or the secondary particle.

The metal oxide is an oxide in which lithium and an element represented by M3 are complexed, or an oxide of M3, and the metal oxide is, for example, $Li_aW_bO_c$, $Li_aZr_bO_c$, $Li_aTi_bO_c$, $Li_aNi_bO_c$, $Li_aB_bO_c$, $Li_aCO_bO_c$, $Li_aAl_bO_c$, $CO_bO_c$, $Al_bO_c$, $W_bO_c$, $Zr_bO_c$, $Ti_bO_c$, or $B_bO_c$, but the above-described examples are merely described for convenience to facilitate understanding and the metal oxide defined herein is not limited to the above-described examples.

In addition, the metal oxide may be an oxide in which lithium and at least two elements represented by M3 are complexed, or may further include a metal oxide in which lithium and at least two elements represented by M3 are complexed. The metal oxide in which lithium and at least two elements represented by M3 are complexed may be, for example, $Li_a(W/Ti)_bO_c$, $Li_a(W/Zr)_bO_c$, $Li_a(W/Ti/Zr)_bO_c$, $Li_a(W/Ti/B)_bO_c$, etc., but is not necessarily limited thereto.

A different concentration gradient pattern represented by cobalt in the lithium composite oxide included in the positive electrode active material according to the present application may be formed by the coating layer. That is, the different concentration gradient pattern exhibited by cobalt in the lithium composite oxide can be realized by the concentration of the cobalt present in the primary particles and/or secondary particle and the concentration of the cobalt in the metal oxide present on the surface of the primary particle and or secondary particle.

As such, the lithium composite oxide exhibiting a different concentration gradient pattern may have improved particle stability in the surface portion and the central portion, and furthermore, the movement of ions and electrons in the central portion is improved, which can contribute to enhancing the efficiency characteristics of the lithium secondary battery.

In another embodiment, the positive electrode active material may be a bimodal-type positive electrode active material including a first lithium composite oxide as small particles and a second lithium composite oxide as large particles. The first lithium composite oxide and the second lithium composite oxide may follow the definition of the lithium composite oxide described above.

In the present application, the range of the average particle diameter (D50) of the small particles and the large particles is not particularly limited, but the reference range of the average particle diameters (D50) of the small particles and the large particles as follows can be determined to distinguish whether any lithium composite oxide is an small particle or large particle.

The small particle means a lithium composite oxide having an average particle diameter (D50) of 7.0 μm or less, and the large particle means a lithium composite oxide having an average particle diameter (D50) of 7.0 μm or more. In this case, when the average particle diameter (D50) of the small particles is 7.0 μm, the average particle diameter (D50) of the large particles will be greater than 7.0 μm. The upper limit of the average particle diameter (D50) of the large particles is not limited, but, for example, the large particles may have an average particle diameter of 7.0 to 30.0 μm.

In the bimodal-type positive electrode active material according to various embodiments of the present invention, the first lithium composite oxide and the second lithium composite oxide having the above-defined average particle diameter (D50) may be present in a mixed state at a weight ratio of 5:95 to 50:50.

In this case, the first lithium composite oxide may be present to fill the voids between the second lithium composite oxide, may be attached to the surface of the second lithium composite oxide, or may also be present in a form in which the first lithium composite oxides are aggregated.

When the ratio of the first lithium composite oxide to the second lithium composite oxide in the positive electrode active material is excessively high or excessively low, the effect of improving the energy density per unit volume of the positive electrode active material may be insignificant as the press density of the positive electrode active material decreases.

Lithium Secondary Battery

Another aspect of the present invention may provide a positive electrode including a positive electrode current collector and a positive electrode active material layer formed on the positive electrode current collector. Here, the positive electrode active material layer may include positive electrode active materials according to various embodiments of the present invention. Therefore, since the positive electrode active material is the same as described above, detailed description thereof will be omitted for convenience, and hereinafter, other components that have not been described will be described.

The positive electrode current collector is not particularly limited as long as it does not cause a chemical change in a battery and has conductivity, and for example, stainless steel, aluminum, nickel, titanium, calcined carbon, or aluminum or stainless steel whose surface is treated with carbon, nickel, titanium or silver may be used. In addition, the positive electrode current collector may conventionally have a thickness of 3 to 500 μm, and fine irregularities may be formed on the surface of the current collector, thereby increasing the adhesive strength of a positive electrode active material. For example, the positive electrode current collector may be used in various forms such as a film, a sheet, a foil, a net, a porous body, foam, a nonwoven fabric, etc.

The positive electrode active material layer may be prepared by coating the positive electrode current collector with a positive electrode slurry composition including the positive electrode active material, a conductive material, and a binder included optionally as needed.

In this case, the positive electrode active material is included at 80 to 99 wt %, and specifically, 85 to 98.5 wt % with respect to the total weight of the positive electrode active material layer. When the positive electrode active material is included in the above content range, excellent capacity characteristics may be exhibited, but the present invention is not limited thereto.

The conductive material is used for imparting conductivity to an electrode, and may be used without particular limitation as long as it has electron conductivity without causing a chemical change in a battery to be formed. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may be generally contained at 0.1 to 15 wt % with respect to the total weight of the positive electrode active material layer.

The binder serves to improve attachment between particles of the positive electrode active material and the adhesive strength between the positive electrode active material and a current collector. A specific example of the binder may be polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluorine rubber, or various copolymers thereof, and one or a mixture of two or more thereof may be used. The binder may be included at 0.1 to 15 wt % with respect to the total weight of the positive electrode active material layer.

The positive electrode may be manufactured according to a conventional method of manufacturing a positive electrode, except that the above-described positive electrode active material is used. Specifically, the positive electrode may be manufactured by coating the positive electrode current collector with a positive electrode slurry composition prepared by dissolving or dispersing the positive electrode active material, and optionally, a binder and a conductive material in a solvent, and drying and rolling the resulting product.

The solvent may be a solvent generally used in the art, and may be dimethyl sulfoxide (DMSO), isopropyl alcohol, N-methylpyrrolidone (NMP), acetone or water, and one or a mixture of two or more thereof may be used. In consideration of the coating thickness and production yield of a slurry, the solvent is used at a sufficient amount for dissolving or dispersing the positive electrode active material, the conductive material and the binder and then imparting a viscosity for exhibiting excellent thickness uniformity when the slurry is applied on the prepared positive electrode.

In addition, in another embodiment, the positive electrode may be prepared by casting the positive electrode slurry composition on a separate support, and laminating a film obtained by delamination from the support on the positive electrode current collector.

Still another aspect of the present invention provides an electrochemical device including the above-described positive electrode. The electrochemical device may be, specifically, a battery, a capacitor, and more specifically, a lithium secondary battery.

The lithium secondary battery may specifically include a positive electrode, a negative electrode disposed opposite to the positive electrode, and a separator film and an electrolyte, which are interposed between the positive electrode and the negative electrode. Here, since the positive electrode is the same as described above, for convenience, detailed description for the positive electrode will be omitted, and other components which have not been described below will be described in detail.

The lithium secondary battery may further include a battery case accommodating an electrode assembly of the positive electrode, the negative electrode and the separator film, and optionally, a sealing member for sealing the battery case.

The negative electrode may include a negative electrode current collector and a negative electrode active material layer disposed on the negative electrode current collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby enhancing the binding strength of the negative electrode active material. For example, the positive electrode current collector may be used in various forms such as a film, a sheet, a foil, a net, a porous body, a foam, a nonwoven body, etc.

The negative electrode active material layer may be formed by coating the negative electrode current collector with a negative electrode slurry composition including the negative electrode active material, a conductive material, and a binder optionally included as needed.

As the negative electrode active material, a compound enabling the reversible intercalation and deintercalation of lithium may be used. A specific example of the negative electrode active material may be a carbonaceous material such as artificial graphite, natural graphite, graphitized carbon fiber or amorphous carbon; a metallic compound capable of alloying with lithium, such as Si, Al, Sn, Pb, Zn, Bi, In, Mg, Ga, Cd, a Si alloy, a Sn alloy or an Al alloy; a metal oxide capable of doping and dedoping lithium such as $SiO_\beta$ ($0<\beta<2$), $SnO2$, vanadium oxide, or lithium vanadium oxide; or a composite including the metallic compound and the carbonaceous material such as a Si—C composite or a Sn—C composite, and any one or a mixture of two or more thereof may be used. In addition, as the negative electrode active material, a metal lithium thin film may be used. In addition, as a carbon material, both low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high-temperature calcined carbon such as petroleum or coal tar pitch derived cokes.

The negative electrode active material may be included at 80 to 99 wt % with respect to the total weight of the negative electrode active material layer.

The binder is a component aiding bonding between a conductive material, an active material and a current collector, and may be generally added at 0.1 to 10 wt % with respect to the total weight of the negative electrode active material layer. Examples of the binder may include polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber, nitrile-butadiene rubber, fluorine rubber, and various copolymers thereof.

The conductive material is a component for further improving conductivity of the negative electrode active material, and may be added at 10 wt % or less, and preferably, 5 wt % or less with respect to the total weight of the negative electrode active material layer. The conductive material is not particularly limited as long as it does not cause a chemical change in the battery, and has conductivity, and may be, for example, graphite such as natural graphite or artificial graphite; carbon black such as acetylene black, Ketjen black, channel black, furnace black, lamp black or thermal black; a conductive fiber such as a carbon fiber or a metal fiber; a metal powder such as fluorinated carbon, aluminum, or nickel powder; a conductive whisker such as zinc oxide or potassium titanate; a conductive metal oxide such as titanium oxide; or a conductive material such as a polyphenylene derivative.

In an embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

In addition, in another embodiment, the negative electrode active material layer may be prepared by coating the negative electrode current collector with a negative electrode slurry composition prepared by dissolving or dispersing a negative electrode active material, and optionally, a binder and a conductive material in a solvent, and drying the coated composition, or may be prepared by casting the negative electrode slurry composition on a separate support and then laminating a film delaminated from the support on the negative electrode current collector.

Meanwhile, in the lithium secondary battery, a separator film is not particularly limited as long as it is generally used in a lithium secondary battery to separate a negative electrode from a positive electrode and provide a diffusion path for lithium ions, and particularly, the separator film has a low resistance to ion mobility of an electrolyte and an excellent electrolyte solution impregnation ability. Specifically, a porous polymer film, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer, or a laminated structure including two or more of these layers may be used. In addition, a conventional porous nonwoven fabric, for example, a nonwoven fabric made of high melting point glass fiber, polyethylene terephthalate fiber, etc. may be used. In addition, a coated separator including a ceramic component or a polymer material may be used to secure heat resistance or mechanical strength, and may optionally be used in a single-layer or multi-layer structure.

In addition, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which is able to be used in the production of a lithium secondary battery, but the present invention is not limited thereto.

Specifically, the electrolyte may include an organic solvent and a lithium salt.

The organic solvent is not particularly limited as long as it can serve as a medium enabling the transfer of ions involved in an electrochemical reaction of a battery. Specifically, the organic solvent may be an ester-based solvent such as methyl acetate, ethyl acetate, γ-butyrolactone, or F-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as R—CN (R is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate (for example, ethylene carbonate or propylene carbonate) having high ion conductivity and high permittivity to increase the charge/discharge performance of a battery and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of approximately 1:1 to 1:9, the electrolyte solution may exhibit excellent performance.

The lithium salt is not particularly limited as long as it is a compound capable of providing a lithium ion used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, or $LiN(CF_3SO_2)_2$. $LiCl$, $LiI$, or $LiB(C_2O_4)_2$ or the like may be used. The concentration of the lithium salt is preferably used within the range of 0.1 M to 2.0 M. When the concentration of the lithium salt is included in the above-mentioned range, the electrolyte has suitable conductivity and viscosity and thus can exhibit excellent electrolytic performance. Therefore, lithium ions can effectively migrate.

To enhance lifetime characteristics of the battery, inhibit a decrease in battery capacity, and enhance discharging capacity of the battery, the electrolyte may further include one or more types of additives, for example, a haloalkylene carbonate-based compound such as difluoroethylene carbonate, pyridine, triethylphosphite, triethanolamine, cyclic ether, ethylene diamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol or aluminum trichloride, in addition to the components of the electrolyte. In this case, the additive(s) may be included at 0.1 to 5 wt % with respect to the total weight of the electrolyte.

Since the lithium secondary battery including the positive electrode active material according to the present invention stably exhibits excellent discharging capacity, excellent output characteristics and excellent lifespan characteristics, it is useful in portable devices such as a mobile phone, a notebook computer and a digital camera and an electric automobile field such as a hybrid electric vehicle (HEV).

The external shape of the lithium secondary battery of the present invention is not particularly limited, but may be a cylindrical type using a can, a prismatic type, a pouch type, or a coin type. In addition, the lithium secondary battery may be used in a battery cell that is not only used as a power source of a small device, but also preferably used as a unit battery for a medium-to-large battery module including a plurality of battery cells.

According to yet another embodiment of the present invention, a battery module including the lithium secondary battery as a unit cell and/or a battery pack including the same is provided.

The battery module or the battery pack may be used as a power source of any one or more medium-to-large devices including a power tool; an electric motor vehicle such as an electric vehicle (EV), a hybrid electric vehicle, and a plug-in hybrid electric vehicle (PHEV); and a power storage system.

Hereinafter, the present invention will be described in more detail through examples. However, these examples are merely provided to explain the present invention, and it will not be interpreted that the scope of the present invention is limited by the examples below.

Preparation Example 1. Preparation of Positive Electrode Active Material

(1) Example 1

(a) $NiCoAl(OH)_2$ hydroxide precursor (Ni:Co:Al=95:4:1 (at %)) through a known co-precipitation method using nickel sulfate, cobalt sulfate, and aluminum sulfate was synthesized. The synthesized hydroxide precursor was heated at 2° C. per minute to 400° C., and calcined at 400° C. for 6 hours to be converted into an oxide precursor.

(b) After mixing the oxide precursor prepared in step (a) with LiOH(Li/(Ni+Co+Al) molar ratio=1.05), the mixture was heated at 2° C. per minute to 800° C. while maintaining an $O_2$ atmosphere in a furnace, and heat-treated at 800° C. for 12 hours to obtain a lithium composite oxide.

(c) A 3.0 mol % aqueous solution of cobalt sulfate was prepared based on the concentration of a transition metal in the lithium composite oxide and added to the lithium composite oxide while stirring for 1 hour to prepare a mixture.

After dehydrating the mixture, it was dried at 120° C. for 12 hours to prepare a dry product.

(d) After mixing the dried product with $B_2O_3$(B/(Ni+Co+Al) mol %=0.3), the temperature was raised at 2° C. per minute to 700° C. while maintaining the $O_2$ atmosphere in the furnace, and heat-treated at 700° C. for 12 hours to obtain a lithium composite oxide having a composition of $Li_1Ni_{0.9179}Co_{0.0691}Al_{0.0100}B_{0.0030}O_2$. The composition of the lithium composite oxide was confirmed through ICP analysis.

(2) Example 2

(a) $NiCoAl(OH)_2$ hydroxide precursor (Ni:Co:Al=95:4:1 (at %)) through a known co-precipitation method using nickel sulfate, cobalt sulfate, and aluminum sulfate was synthesized. The synthesized hydroxide precursor was heated at 2° C. per minute to 400° C., and calcined at 400° C. for 6 hours to be converted into an oxide precursor.

(b) After mixing the oxide precursor prepared in step (a) with LiOH(Li/(Ni+Co+Al) molar ratio=1.05) and $B_2O_3$(Li/(Ni+Co+Al) mol %=0.2), the mixture was heated at 2° C. per minute to 800° C. while maintaining an $O_2$ atmosphere in a furnace, and heat-treated at 800° C. for 12 hours to obtain a lithium composite oxide.

(c) A 3.0 mol % aqueous solution of cobalt sulfate was prepared based on the concentration of a transition metal in the lithium composite oxide and added to the lithium composite oxide while stirring for 1 hour to prepare a mixture. After dehydrating the mixture, it was dried at 120° C. for 12 hours to prepare a dry product.

(d) After mixing the dried product with $B_2O_3$(B/(Ni+Co+Al) mol %=0.3), the temperature was raised at 2° C. per minute to 700° C. while maintaining the 02 atmosphere in the furnace, and heat-treated at 700° C. for 12 hours to obtain a lithium composite oxide having a composition of $Li_1Ni_{0.9161}Co_{0.0689}Al_{0.0100}B_{0.0050}O_2$. The composition of the lithium composite oxide was confirmed through ICP analysis.

(3) Example 3

A lithium composite oxide was obtained in the same manner as in Example 1, except that the dried product was mixed with $B_2O_3$(B/(Ni+Co+Al) mol %=0.5) in step (d) and then heat-treated. As a result of ICP analysis, it was confirmed that the obtained lithium composite oxide had a composition of $Li_1Ni_{0.9161}Co_{0.0689}Al_{0.0100}B_{0.0050}O_2$. The composition of the lithium composite oxide was confirmed through ICP analysis.

(4) Example 4

A lithium composite oxide was obtained in the same manner as in Example 1, except that the dried product was mixed with $B_2O_3$(B/(Ni+Co+Al) mol %=0.3) and $ZrO_2$ (Zr/(Ni+Co+Al) mol %=0.2) in step (d) and then heat-treated. As a result of ICP analysis, it was confirmed that the obtained lithium composite oxide had a composition of $Li_1Ni_{0.9161}Co_{0.0689}Al_{0.010}B_{0.0030}Zr_{0.0020}O_2$. The composition of the lithium composite oxide was confirmed through ICP analysis.

(5) Example 5

A lithium composite oxide was obtained in the same manner as in Example 1, except that the dried product was mixed with $B_2O_3$(B/(Ni+Co+Al) mol %=0.3) and $TiO_2$ (Ti/(Ni+Co+Al) mol %=0.2) in step (b) and then calcined. As a result of ICP analysis, it was confirmed that the obtained lithium composite oxide had a composition of $Li_1Ni_{0.9161}Co_{0.0689}Al_{0.010}B_{0.0030}Ti_{0.0020}O_2$. The composition of the lithium composite oxide was confirmed through ICP analysis.

(6) Example 6

A lithium composite oxide was obtained in the same manner as in Example 1, except that the dried product was mixed with $B_2O_3$(B/(Ni+Co+Al) mol %=0.3) and MgO(Mg/(Ni+Co+Al) mol %=0.2) in step (b) and then calcined. As a result of ICP analysis, it was confirmed that the obtained lithium composite oxide had a composition of $Li_1Ni_{0.9161}Co_{0.0689}Al_{0.010}B_{0.0030}Mg_{0.0020}O_2$. The composition of the lithium composite oxide was confirmed through ICP analysis.

(7) Comparative Example 1

(a) $NiCoAl(OH)_2$ hydroxide precursor (Ni:Co:Al=95:4:1 (at %)) through a known co-precipitation method using nickel sulfate, cobalt sulfate, and aluminum sulfate was synthesized. The synthesized hydroxide precursor was heated at 2° C. per minute to 400° C., and calcined at 400° C. for 6 hours to be converted into an oxide precursor.

(b) After mixing the oxide precursor prepared in step (a) with LiOH(Li/(Ni+Co+Al) mol ratio=1.05) and $B_2O_3$(B/(Ni+Co+Al) mol %=0.3), the mixture was heated at 2° C. per minute to 800° C. while maintaining an 02 atmosphere in a furnace, and heat-treated at 800° C. for 12 hours to obtain a lithium composite oxide.

(c) A 3.0 mol % aqueous solution of cobalt sulfate was prepared based on the concentration of a transition metal in the lithium composite oxide and added to the lithium composite oxide while stirring for 1 hour to prepare a mixture. After dehydrating the mixture, it was dried at 120° C. for 12 hours to prepare a dry product.

(d) The dried product was heated at 2° C. per minute to 700° C. while maintaining an $O_2$ atmosphere in a furnace, and heat-treated at 700° C. for 12 hours to obtain a lithium composite oxide having a composition of $Li_1Ni_{0.9179}Co_{0.0691}Al_{0.0100}B_{0.0030}O_2$. The composition of the lithium composite oxide was confirmed through ICP analysis.

(8) Comparative Example 2

A lithium composite oxide was obtained in the same manner as in Example 2, except that the dried product was mixed with $B_2O_3$(B/(Ni+Co+Al) mol %=0.8) in step (d) and then calcined. As a result of ICP analysis, it was confirmed that the obtained lithium composite oxide had a composition of $Li_1Ni_{0.9113}Co_{0.0687}Al_{0.0100}B_{0.0100}O_2$. The composition of the lithium composite oxide was confirmed through ICP analysis.

(9) Comparative Example 3

A lithium composite oxide was obtained in the same manner as in Example 1, except that the dried product was mixed with $B_2O_3$(B/(Ni+Co+Al) mol %=1.0) in step (d) and then calcined. As a result of ICP analysis, it was confirmed that the obtained lithium composite oxide had a composition of $Li_1Ni_{0.9113}Co_{0.0687}Al_{0.0100}B_{0.0100}O_2$. The composition of the lithium composite oxide was confirmed through ICP analysis.

(10) Comparative Example 4

(a) $NiCoAl(OH)_2$ hydroxide precursor (Ni:Co:Al=95:4:1 (at %)) through a known co-precipitation method using nickel sulfate, cobalt sulfate, and aluminum sulfate was synthesized. The synthesized hydroxide precursor was heated at 2° C. per minute to 400° C., and calcined at 400° C. for 6 hours to be converted into an oxide precursor.

(b) After mixing the oxide precursor prepared in step (a) with LiOH(Li/(Ni+Co+Al) molar ratio=1.05), the mixture was heated at 2° C. per minute to 800° C. while maintaining an 02 atmosphere in a furnace, and heat-treated at 800° C. for 12 hours to obtain a lithium composite oxide.

(c) The lithium composite oxide was heated at 2° C. per minute to 700° C. while maintaining the 02 atmosphere in the furnace, and heat-treated at 700° C. for 12 hours to obtain a lithium composite oxide having a composition of $Li_1Ni_{0.950}Co_{0.040}Al_{0.010}O_2$. The composition of the lithium composite oxide was confirmed through ICP analysis.

Preparation Example 2. Manufacture of Lithium Secondary Battery 92 wt % of each positive electrode active material prepared according to Preparation Example 1, 4 wt % of artificial graphite, and 4 wt % of a PVDF binder were dispersed in 30 g of N-methyl-2 pyrrolidone (NMP) to prepare a positive electrode slurry. The positive electrode slurry was uniformly applied on an aluminum thin film having a thickness of 15 μm and vacuum dried at 135° C. to prepare a positive electrode for a lithium secondary battery.

Using lithium foil as a counter electrode to the positive electrode and a porous polyethylene membrane (Celgard 2300, thickness: 25 μm) as a separator, a coin cell was manufactured using an electrolyte in which $LiPF_6$ was present at a concentration of 1.15 M in a solvent in which ethylene carbonate and ethyl methyl carbonate were mixed in a volume ratio of 3:7.

Experimental Example 1. EP-EDS Analysis of Positive Electrode Active Material In order to measure the content of cobalt in the lithium composite oxide included in the positive electrode active material prepared according to Preparation Example 1, EP-EDS analysis was performed. In the EP-EDS analysis, after selecting the lithium composite oxide included in the positive electrode active material prepared according to Preparation Example 1, cumulative concentrations (at %) of cobalt were analyzed to a certain depth to which an electron beam penetrated for each acceleration voltage while the acceleration voltage of the electron beam radiated to the surface of the selected lithium composite oxide was varied from 1 kV to 30 kV (1 kV, 3 kV, 5 kV, 7.5 kV, 10 kV, 12.5 kV, 15 kV, 22.5 kV, and 30 kV).

A region in which the acceleration voltage of the electron beam radiated to the surface of the lithium composite oxide is in the range of 1 kV to 10 kV is set to a first concentration gradient section, and a region in which the acceleration voltage is in the range of 10 kV to 30 kV is set to a second concentration gradient section. In addition, a slope of the concentration gradient of the cobalt in the first concentration gradient section was set to s1, and a slope of the concentration gradient of the cobalt in the second concentration gradient section was set to s2.

s1 and s2, representing the slope of the concentration gradient of the cobalt, were calculated by taking a y-axis as a change amount in the cobalt concentration (Δat %) and an x-axis as a change amount in the EDS acceleration voltage (ΔkV %), and were calculated as average values obtained by summing the slopes of the respective measurement regions.

The EP-EDS analysis results of the lithium composite oxide included in the positive electrode active material prepared according to Preparation Example 1 are shown in Tables 1 and 2 below.

TABLE 1

| | Concentration of cobalt by acceleration voltage (at %) | | | | | | | | |
|---|---|---|---|---|---|---|---|---|---|
| Classification | 1 kV | 3 kV | 5 kV | 7.5 kV | 10 kV | 12.5 kV | 15 kV | 22.5 kV | 30 kV |
| Example 1 | 38.50 | 28.31 | 21.71 | 16.89 | 14.05 | 12.91 | 12.11 | 10.41 | 9.38 |
| Example 2 | 38.05 | 27.98 | 19.88 | 16.35 | 13.77 | 13.22 | 11.75 | 10.51 | 9.57 |
| Example 3 | 37.90 | 28.74 | 21.34 | 16.60 | 13.98 | 13.47 | 12.35 | 10.83 | 9.88 |
| Example 4 | 33.50 | 26.80 | 19.85 | 16.11 | 13.81 | 13.01 | 11.73 | 10.39 | 9.53 |
| Example 5 | 33.53 | 25.26 | 19.45 | 15.79 | 13.53 | 12.75 | 11.50 | 10.18 | 9.34 |
| Example 6 | 37.35 | 27.46 | 21.06 | 16.38 | 13.63 | 12.52 | 11.75 | 10.10 | 9.10 |
| Comparative Example 1 | 32.10 | 23.00 | 18.04 | 15.05 | 13.00 | 12.11 | 11.23 | 10.21 | 9.03 |
| Comparative Example 2 | 46.60 | 34.46 | 25.53 | 19.42 | 15.29 | 14.23 | 11.98 | 10.69 | 9.78 |
| Comparative Example 3 | 62.99 | 47.46 | 33.15 | 24.06 | 16.70 | 14.80 | 12.15 | 11.41 | 10.03 |
| Comparative Example 4 | 27.10 | 25.00 | 23.04 | 20.05 | 18.00 | 16.51 | 14.29 | 11.21 | 9.01 |

TABLE 2

| Classification | s1 | s2 | s1 − s2 |
|---|---|---|---|
| Example 1 | 2.86 | 0.29 | 2.57 |
| Example 2 | 2.88 | 0.34 | 2.54 |
| Example 3 | 2.81 | 0.43 | 2.38 |
| Example 4 | 2.31 | 0.59 | 1.72 |
| Example 5 | 2.35 | 0.44 | 1.91 |
| Example 6 | 2.78 | 0.52 | 2.26 |
| Comparative Example 1 | 1.89 | 0.28 | 1.61 |
| Comparative Example 2 | 3.66 | 0.46 | 3.20 |
| Comparative Example 3 | 5.38 | 0.78 | 4.60 |
| Comparative Example 4 | 1.00 | 0.83 | 0.17 |

Referring to the results of Tables 1 and 2, a concentration gradient in which the concentration of the cobalt decreases from the surface portion of the lithium composite oxide included in the positive electrode active material according to each of Examples 1 to 6 toward the central portion thereof is formed, and it can be confirmed that there is a significant difference between the slopes of the concentration gradients when the region where the acceleration voltage of the electron beam radiated to the surface of the lithium composite oxide is in the range of 1 kV to 10 kV is defined as the first concentration gradient section and the region where the acceleration voltage is in the range of 10 kV to 30 kV is defined as the second concentration gradient section.

On the other hand, in the case of the lithium composite oxide included in the positive electrode active material according to Comparative Example 4, a concentration gradient in which the concentration of the cobalt decreases from the surface portion toward the central portion is formed, but it can be confirmed that there is not a significant difference between the slopes of the concentration gradients when the region where the acceleration voltage of the electron beam radiated to the surface of the lithium composite oxide is in the range of 1 kV to 10 kV is defined as the first concentration gradient section and the range where the acceleration voltage is in the range of 10 kV to 30 kV is defined as the second concentration gradient section.

Experimental Example 2. Evaluation of Electrochemical Properties of Lithium Secondary Battery A charging and discharging experiment was carried out by applying a voltage range of 3.0V to 4.25V at 25° C., and a discharge rate of 0.2 C using an electrochemical analyzer (Toyo, Toscat-3100) for the lithium secondary battery (coin cell) manufactured in Preparation Example 2 to measure the charging and discharging capacity In addition, the same lithium secondary battery was charged/discharged 50 times under the condition of 1 C/1 C in a driving voltage range of 3.0 V to 4.25 V at 25° C., and then the ratio of the discharging capacity at the 50th cycle to the initial capacity (cycle capacity retention rate) was measured.

The measurement results are shown in Table 3 below.

TABLE 3

| Classification | Charging capacity (mAh/g) | Discharging capacity (mAh/g) | Charging/ discharging efficiency (%) | Retention@50 cy (%) |
|---|---|---|---|---|
| Example 1 | 240.1 | 216.3 | 90.1 | 94.7 |
| Example 2 | 238.5 | 214.7 | 90.0 | 94.6 |
| Example 3 | 238.7 | 214.7 | 89.9 | 94.3 |
| Example 4 | 239.4 | 215.3 | 89.9 | 94.5 |
| Example 5 | 237.9 | 214.9 | 90.3 | 93.9 |
| Example 6 | 239.7 | 215.5 | 89.9 | 94.5 |
| Comparative Example 1 | 236.5 | 207.9 | 87.9 | 89.5 |
| Comparative Example 2 | 236.7 | 207.9 | 87.7 | 88.3 |
| Comparative Example 3 | 237.9 | 208.1 | 87.5 | 90.0 |
| Comparative Example 4 | 237.5 | 206.7 | 87.0 | 87.4 |

Experimental Example 3. Stability Evaluation of Positive Electrode Active Materials and Lithium Secondary Batteries (1) Crack Area after Life of Positive Electrode Active Material The lithium secondary battery (coin cell) manufactured in Preparation Example 2 was charged/discharged 50 times under the condition of 1 C/1 C in a driving voltage range of 3.0 V to 4.25 V at 25° C., then the positive electrode was separated, and the positive electrode active material was recovered from the separated positive electrode, and then a cross-sectional SEM image was taken.

In order to quantify the crack area in the cross-sectional SEM image, the outline of a plurality of particles identified from the (binarized) cross-sectional SEM image is set, the dark area in the outline is regarded as a crack, and the ratio of the area of the dark region to the total area in the outline was defined as a crack generation rate (%).

The crack generation rates measured according to the above-described method are shown in Table 4 below.

TABLE 4

| Classification | Crack generation rate (%) |
| --- | --- |
| Example 1 | 11.9 |
| Example 2 | 12.0 |
| Example 3 | 12.5 |
| Example 4 | 11.5 |
| Example 5 | 13.0 |
| Example 6 | 12.7 |
| Comparative Example 1 | 30.0 |
| Comparative Example 2 | 27.9 |
| Comparative Example 3 | 31.9 |
| Comparative Example 4 | 32.8 |

Referring to the results of Table 4, it can be confirmed that the crack generation rate after the life of the lithium secondary battery is decreased in each of the positive electrode active materials according to Examples 1 to 6 compared to each of the positive electrode active materials according to Comparative Examples 1 to 4.

(2) Measurement of Gas Generation Amount in Lithium Secondary Batteries

After charging the lithium secondary battery manufactured according to Preparation Example 2 to 4.25V at a constant current of 0.2 C, and storing the charged lithium secondary battery at 60° C. for 14 days, the change in volume of the lithium secondary battery due to gas generation in the lithium secondary battery was measured. The volume change measurement results are shown in Table 5 below.

TABLE 5

| Classification | Gas generation amount ($\Delta cm^3$) |
| --- | --- |
| Example 1 | 0.16 |
| Example 2 | 0.23 |
| Example 3 | 0.27 |
| Example 4 | 0.11 |
| Example 5 | 0.19 |
| Example 6 | 0.21 |
| Comparative Example 1 | 0.74 |
| Comparative Example 2 | 0.71 |
| Comparative Example 3 | 0.51 |
| Comparative Example 4 | 0.77 |

Cracks may occur in the positive electrode active material according to repeated charging and discharging, and through the cracks, a side reaction between the positive electrode active material and the electrolyte may occur, thereby increasing the possibility of generating gas. Referring to the results in Table 6, it can be confirmed that the change in volume of the lithium secondary battery using each of the positive electrode active material according to Examples 1 to 6 is smaller than that of the lithium secondary battery using each of the positive electrode active materials according to Comparative Examples 1 to 4.

What is claimed is:

1. A positive electrode active material comprising a lithium composite oxide containing at least nickel and cobalt, wherein:

the cobalt in the lithium composite oxide has a concentration gradient that decreases from a surface portion of the lithium composite oxide toward a central portion thereof; and the concentration gradient of the cobalt has at least different slopes, and signs of the different slopes are the same, wherein, in Energy Profiling-Energy Dispersive X-Ray Spectroscopy (EP-EDS) analysis which measures a cumulative concentration of the cobalt from a surface of the lithium composite oxide to a depth to which an electron beam penetrates using the electron beam radiated with an acceleration voltage increasing from 1 kV to 30 kV with respect to the surface of the lithium composite oxide, an inflection point at which the slope of the concentration gradient of the cobalt in the lithium composite oxide changes in a region where the acceleration voltage is 7.5 kV to 12.5 kV is present, and wherein, when s1 represents the slope of the concentration gradient of the cobalt in the lithium composite oxide in a region where the acceleration voltage is 1 kV to 10 kV, s1 satisfies the following Equation 1, $$2.0 \leq s1 \leq 3.6. \tag{Equation 1}$$

2. The positive electrode active material of claim 1, wherein an absolute value of a slope of the cobalt in the lithium composite oxide relatively close to the surface portion of the lithium composite oxide is greater than an absolute value of a slope of the cobalt relatively close to the central portion of the lithium composite oxide.

3. The positive electrode active material of claim 1, wherein:

the lithium composite oxide is a secondary particle in which a plurality of primary particles are aggregated;

cobalt in the secondary particle has a concentration gradient that decreases from a surface portion of the secondary particle toward a central portion thereof; and in EP-EDS analysis which measures a cumulative concentration of the cobalt from a surface of the secondary particle to a depth to which an electron beam penetrates using the electron beam radiated with an acceleration voltage increasing from 1 kV to 30 kV with respect to the surface of the secondary particle, an inflection point at which the slope of the concentration gradient of the cobalt in the secondary particle changes in a region where the acceleration voltage is 7.5 kV to 12.5 kV is present.

4. The positive electrode active material of claim 1, wherein, when s2 represents the slope of the concentration gradient of the cobalt in the lithium composite oxide in a region where the acceleration voltage is 10 kV to 30 kV, s2 satisfies the following Equation 2, $$0.2 \leq s2 \leq 0.7. \tag{Equation 2}$$

5. The positive electrode active material of claim 1, wherein, when s1 represents the slope of the concentration gradient of the cobalt in the lithium composite oxide in a region where the acceleration voltage is 1 kV to 10 kV and s2 represents the slope of the concentration gradient of the cobalt in the lithium composite oxide in a region where the acceleration voltage is 10 kV to 30 kV, s1 and s2 satisfy Equation 3 below:

$$1.7 \leq s1 - s2 \leq 3.0. \tag{Equation 3}$$

6. The positive electrode active material of claim 1, wherein the lithium composite oxide is represented by the following Chemical Formula 1, $$Li_w Ni_{1-(x+y+z+z')} Co_x M1_y M2_z B_{z'} O_2 \tag{Chemical Formula 1}$$

where M1 is at least one selected from Mn and Al,

M2 is at least one selected from P, Sr, Ba, Ti, Zr, Mn, Al, W, Ce, Hf, Ta, Cr, F, Mg, Cr, V, Fe, Zn, Si, Y, Ga, Sn, Mo, Ge, Nd, Gd, and Cu, M1 and M2 are different from each other, $0.5 \leq w \leq 1.5$, $0 \leq x \leq 0.50$, $0 \leq y \leq 0.20$, $0 \leq z \leq 0.20$, and $0 \leq z' \leq 0.20$.

7. The positive electrode active material of claim 3, wherein:

the lithium composite oxide further includes a coating layer covering at least a portion of an interface between the primary particles and the surface of the secondary particle; and at least one metal oxide represented by the following Chemical Formula 2 is present in the coating layer:

$$Li_a M3_b O_c \qquad \text{[Chemical Formula 2]}$$

where M3 is at least one selected from Ni, Mn, Co, Fe, Cu, Nb, Mo, Ti, Al, Cr, Zr, Zn, Na, K, Ca, Mg, Pt, Au, B, P, Eu, Sm, W, Ce, V, Ba, Ta, Sn, Hf, Ce, Gd, and Nd, $0 \leq a \leq 10$, $0 \leq b \leq 8$, and $2 \leq c \leq 13$, provided that a and b are not simultaneously 0.

8. A positive electrode comprising the positive electrode active material of claim 1.

9. A lithium secondary battery using the positive electrode of claim 8.

* * * * *